Figure 1:
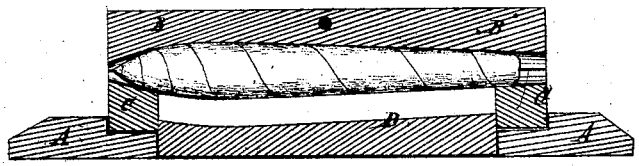
Figure 2:
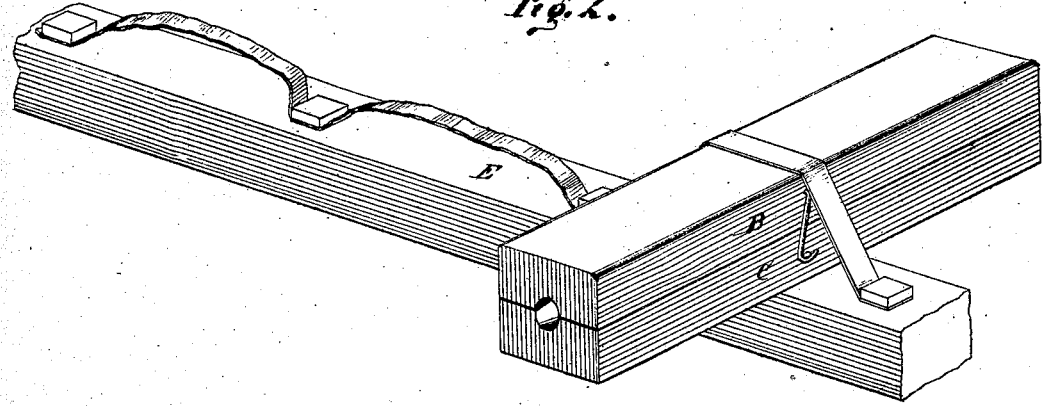

John Charter.
Mode of Moulding Cigars.

Patented Jul 11 1871

116930

Witnesses:
H. J. Stretz
Thos. D. D. Durand

Inventor:
John Charter.
Per [signature]
Attorneys.

UNITED STATES PATENT OFFICE.

JOHN CHARTER, OF STERLING, ILLINOIS.

IMPROVEMENT IN MOLDING CIGARS.

Specification forming part of Letters Patent No. 116,930, dated July 11, 1871.

*To all whom it may concern:*

Be it known that I, JOHN CHARTER, of the city of Sterling, in the county of Whitesides and State of Illinois, have invented a new and Improved Mode of Molding Cigars; and I do hereby declare that the following is a full and exact description of the same, reference being had to the annexed drawing.

The nature of my invention consists in providing the mortised block A and the blocks B and C, the latter provided with the sliding block D fitted into its base, all used in connection with the board E and rubber rings to said board E, attached for the purpose of molding cigars.

To enable others skilled in the art to make and use my invention, I will proceed to describe its construction and operation.

I construct the block A with the parallelogram mortise, as shown in the accompanying drawing, out of any suitable wood, and the blocks B and C each faced so as to fit closely together, also made of any suitable wood, and each having in its said fitting face a groove cut the shape and proportion of one-half of the cigar desired to be molded; also, in the base of the block C a mortise is cut from the bottom of said block C through and into said groove in said block C. Into this mortise in said block C is fitted the sliding wooden block D, the latter being made of such size as to be moved readily in said mortise, and that, when said sliding block D is forced into said block C so that the outside surface of said sliding block is on a line with the bottom of said block C, the groove on the inner face of said sliding block D exactly comports with and makes perfect the said groove in said block C. The board E is made of wood of any desired length, having attached to its upper surface the said rubber rings, with such distances between the said rings as to allow, without inconvenience, of the insertion into said rings and withdrawal therefrom of said molds. The said block C is provided also with a staple, F, on either side, and the block B is provided with the hooks C to fasten into said staples when the molds are closed.

The mode of operating said mold is as follows: The mortised block A is laid upon any smooth surface; the block C is then laid upon the block A with the said sliding block D directly over the mortise in said block A, and with the groove in block C upward. The operator then, by the insertion of two fingers in the groove in said block C, forces the said sliding block down into said mortise in said block A. The cigar is then placed in the groove in block C, and block B placed on block C, so that the grooves and faces of blocks B and C may correspond. The said hooks are then fastened or pushed into said staples, and the blocks B and C, thus fastened together, are lifted out of block A, and by pressing them downward on any smooth surface, with the said sliding block downward, the said sliding block is forced up into said block C until the lower surfaces of the sliding block D and the block C are on an exact line. The mold is then placed in the rubber rings until the cigar is sufficiently hardened to retain its shape. The said sliding block D should fit into the mortise in block C sufficiently tight not to drop out when the molds are lifted with the sliding block downward.

One advantage which I claim for this mold is that the cigar need not be turned after being placed in the molds, and no crease is left in the sides of the cigar when taken from the molds.

I make no claim to the board E and the rubber rings thereto attached; but

What I do claim as my invention, and desire to secure by Letters Patent, is—

The block A with said mortise therein, the said block B with said groove therein, the said block C with said groove therein, the said sliding block D fitted to and operating in said block C with the groove in said sliding block, and the said hooks G and staples F, all combined and operating substantially as and for the purpose above set forth.

JOHN CHARTER.

Witnesses:
   JNO. P. MANAHAN,
   JOS. M. PATTERSON.